(12) United States Patent
Nakayama et al.

(10) Patent No.: US 8,854,701 B2
(45) Date of Patent: Oct. 7, 2014

(54) IMAGE-FORMING LENS, IMAGE READER, AND IMAGE-FORMING DEVICE

(71) Applicants: Hirotoshi Nakayama, Isehara (JP); Kiichiro Nishina, Yokohama (JP); Masahiro Itoh, Sagamihara (JP)

(72) Inventors: Hirotoshi Nakayama, Isehara (JP); Kiichiro Nishina, Yokohama (JP); Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/792,341

(22) Filed: Mar. 11, 2013

(65) Prior Publication Data

US 2013/0242362 A1   Sep. 19, 2013

(30) Foreign Application Priority Data

Mar. 13, 2012 (JP) ................. 2012-055417

(51) Int. Cl.
| | | |
|---|---|---|
| H04N 1/04 | (2006.01) | |
| H04N 1/03 | (2006.01) | |
| H04N 1/00 | (2006.01) | |
| G02B 13/24 | (2006.01) | |
| G02B 3/00 | (2006.01) | |

(52) U.S. Cl.
CPC .. G02B 3/00 (2013.01); H04N 1/03 (2013.01); H04N 1/00 (2013.01); G02B 13/24 (2013.01)
USPC ............ 358/474; 358/475; 358/509; 359/687

(58) Field of Classification Search
CPC ....... H04N 1/02895; H04N 1/03; H04N 1/29; H04N 1/04; G02B 9/62; G02B 13/18; G02B 3/00; G02B 13/24; G02B 15/14

USPC ........... 358/474, 475, 509, 1.7, 300; 359/757, 359/713, 770, 775, 771, 205, 727, 687
See application file for complete search history.

(56) References Cited

U.S. PATENT DOCUMENTS

| | | |
|---|---|---|
| 4,690,518 A | 9/1987 | Kouchiwa et al. |
| 4,738,517 A | 4/1988 | Nishina et al. |
| 4,753,522 A | 6/1988 | Nishina et al. |
| 4,836,630 A * | 6/1989 | Takanashi ................. 359/197.1 |
| 4,836,664 A | 6/1989 | Nishina |
| 4,997,265 A | 3/1991 | Nishina |
| 5,311,364 A | 5/1994 | Kanoshima et al. |

(Continued)

FOREIGN PATENT DOCUMENTS

| | | |
|---|---|---|
| JP | 2002-82282 | 3/2002 |
| JP | 2002-244033 | 8/2002 |
| JP | 3862446 | 10/2006 |
| JP | 2007-219529 | 8/2007 |

*Primary Examiner* — Negussie Worku
(74) *Attorney, Agent, or Firm* — Oblon, Spivak, McClelland, Maier & Neustadt, L.L.P.

(57) ABSTRACT

An image-forming lens includes, in order from an object side to an image side, a first group having a negative power as a whole, the first group consisting of a positive meniscus lens having a convex surface on the object side and a negative meniscus lens having a convex surface on the object side, the positive meniscus lens and the negative meniscus lens being cemented, an aperture stop, a second group consisting of a positive meniscus lens having a convex surface on the image side, a third group consisting of a positive meniscus lens having a convex surface on the image side, a fourth group consisting of a lens having a negative power, and a fifth group consisting of a biconcave lens.

7 Claims, 6 Drawing Sheets

(56) References Cited

U.S. PATENT DOCUMENTS

| | | | |
|---|---|---|---|
| 5,680,254 A | 10/1997 | Ueda et al. | |
| 5,781,324 A | 7/1998 | Nishina | |
| 6,014,262 A * | 1/2000 | Noda | 359/641 |
| 6,304,388 B1 * | 10/2001 | Shimo | 359/687 |
| 6,404,530 B1 * | 6/2002 | Takeuchi | 359/196.1 |
| 6,909,559 B2 * | 6/2005 | Nishina | 359/772 |
| 7,002,756 B2 * | 2/2006 | Saitoh | 359/689 |
| 7,075,735 B2 * | 7/2006 | Nozawa et al. | 359/726 |
| 7,113,346 B1 * | 9/2006 | Souma et al. | 359/687 |
| 7,133,220 B2 * | 11/2006 | Nishina | 359/775 |
| 7,180,682 B1 * | 2/2007 | Terada | 359/687 |
| 7,339,748 B2 * | 3/2008 | Terada et al. | 359/687 |
| 7,450,275 B2 * | 11/2008 | Nishina | 358/474 |
| 8,482,861 B2 * | 7/2013 | Tashiro | 359/682 |
| 8,531,778 B2 * | 9/2013 | Katsuragi | 359/694 |
| 8,547,644 B2 * | 10/2013 | Sato | 359/680 |
| 8,587,878 B2 * | 11/2013 | Ohashi et al. | 359/753 |
| 2002/0101665 A1 | 8/2002 | Ohashi et al. | |
| 2002/0163739 A1 | 11/2002 | Hayashide et al. | |
| 2003/0007067 A1 | 1/2003 | Masuda et al. | |
| 2003/0206736 A1 | 11/2003 | Nishina | |
| 2004/0021791 A1 | 2/2004 | Nishina | |
| 2004/0057124 A1 | 3/2004 | Nishina | |
| 2004/0184160 A1 | 9/2004 | Nishina et al. | |
| 2004/0264008 A1 | 12/2004 | Nishina | |
| 2005/0141103 A1 | 6/2005 | Nishina | |
| 2005/0152048 A1 * | 7/2005 | Nishina | 359/772 |
| 2005/0185288 A1 | 8/2005 | Nishina et al. | |
| 2005/0195492 A1 | 9/2005 | Nishina et al. | |
| 2005/0195493 A1 | 9/2005 | Nishina et al. | |
| 2006/0114577 A1 | 6/2006 | Nishina | |
| 2008/0019017 A1 | 1/2008 | Nishina | |
| 2008/0278779 A1 | 11/2008 | Nishina et al. | |
| 2010/0020367 A1 | 1/2010 | Abe et al. | |
| 2014/0126072 A1 * | 5/2014 | Ohashi et al. | 359/753 |

\* cited by examiner

200
IMAGE-FORMING LENS, IMAGE READER, AND IMAGE-FORMING DEVICE

PRIORITY CLAIM

The present application is based on and claims priority from Japanese Patent Application No. 2012-055417, filed on Mar. 13, 2012, the disclosure of which is hereby incorporated by reference in its entirety.

BACKGROUND

1. Field of the Invention

The present invention relates to an image-forming lens for use in a document-reading unit in a facsimile or digital complex machine and various image scanners, an image reader, and an image-forming device.

2. Description of the Related Art

An image reader for use in a facsimile or digital complex machine is configured to reduce image information to be read by an image-forming lens, and to convert the image information into image signals by imaging the image information on an imaging element such as a CCD. A three-line CCD in which a plurality of light-receiving elements having red, green and blue filters is arranged in three lines in one chip, for example, is used for reading color document information in full color. The document image is resolved into three primary colors by imaging the document image on the light-receiving surface of the three-line CCD, and the color image information is converted into signals by such an optical system.

Figure 1:
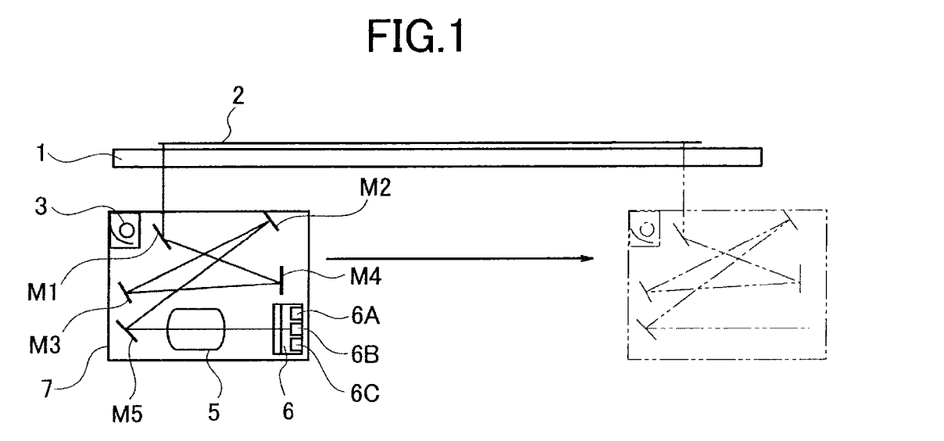
FIG. 1 is a view illustrating an embodiment of an image reader according to the present invention.

FIG. 1 illustrates one example of an optical system for converting the color information into signals. A document 2 having an image to be read is flatly placed on a contact glass 1 such as a platen, and an illumination unit 3 is disposed below the contact glass 1. A slit portion extending in the front direction of the document 2 is illuminated by using the illumination unit 3 including a long light such as a xenon lamp or halogen lamp and a reflector.

The reflection light from the illuminated part of the image in the document 2 is sequentially reflected by folding mirrors M1, M2, M3, M4, M5, and a reduced image of the document image is formed on the imaging surface of a line sensor 6 as a photoelectric conversion element.

The illumination unit 3, folding mirrors M1, M2, M3, M4, M5, image-forming lens 5, and photoelectric conversion element 6 are integrally held as a reading optical unit 7. The reading optical unit 7 travels in the arrow direction (right direction in FIG. 1) by a not-shown driver, and reads the information of the entire document by displacing the reading optical unit 7 to a position illustrated by the dashed line.

The line sensor 6 as an imaging portion includes photoelectric conversion elements 6A, 6B, 6C having red (R), green (G) and blue (B) filters as a color-resolving unit, and converts the document image into image signals by illuminating and scanning the three-line CCD (three-line sensor) in which three lines are arranged in one chip. The document 2 is thereby read, and the color image of the document 2 is resolved into three primary colors of red (R), green (G) and blue (B).

The image reader is a device which reads an image in full color, and includes a color-resolving unit. The color-resolving unit is provided in an imaging optical path of the image-forming lens 5, and has red (R), green (G) and blue (B) filters 6A, 6B, 6C provided in the three-line CCD 6.

Another method different from the above color-resolving method includes a method of resolving a color into red (R), green (G) and blue (B) by selectively inserting a color-resolving prism and a filter between the image-forming lens and the line sensor. Moreover, such a method includes a method of illuminating a document by sequentially illuminating red (R), green (G) and blue (B) light sources. Document information can be read as a monochrome without providing the color-resolving element in the imaging optical path.

The image reader includes the five folding mirrors, but the number of folding minors can be increased or decreased according to the size of the reading optical unit 7 or the like.

A high contrast in a high spatial frequency region is generally required in an imaging surface of an image-forming lens for use in such an optical system. An opening efficiency close to 100% is requested until an angle of view peripheral part. It is also necessary to conform the imaging position of the respective colors of red (R), green (G) and blue (B) on the light-receiving surface, and to preferably correct chromatic aberration of respective colors, in order to preferably read a color document. It is also necessary to reduce a conjugation length, and have a wide-angle lens in order to achieve the downsizing of the optical system.

As such a wide-angle reading lens, Patent Document 1 (JP3862466B) and Patent Document 2 (JP2002-244033A) describe an imaging reading lens. The image-forming lens described in Patent Documents 1, 2 includes a configuration having the relatively small number of lenses such as a five-group and five-lens configuration, and a half-angle of view of about 30°. Such an image-forming lens uses a so-called anamorphic lens having a refractive power different in the orthogonal direction. Therefore, such an image-forming lens includes many processing problems, and the costs of the image-forming lens are also increased.

As an image-forming lens using an axisymmetric aspheric surface, Patent Documents 3 (JP3939908B) and Patent Document 4 (JP4496231B) describe an image-forming lens. However, the image-forming lens described in Patent Documents 3, 4 includes a narrow half-angle of view of about 21.5°, and a long conjugation length of an optical system. Therefore, downsizing cannot be achieved.

SUMMARY

The present invention has been made in view of the above problems, and an object of the present invention to provide a small and low-cost image-forming lens with a configuration having a relatively small number of lenses such as a five-group and six-lens configuration, an image reader, and an image-forming device.

To attain the above object, one embodiment of the present invention provides an image-forming lens, including, in order from an object side to an image side, a first group having a negative power as a whole, the first group consisting of a positive meniscus lens having a convex surface on the object side and a negative meniscus lens having a convex surface on the object side, the positive meniscus lens and the negative meniscus lens being cemented; an aperture stop; a second group consisting of a positive meniscus lens having a convex surface on the image side; a third group consisting of a positive meniscus lens having a convex surface on the image side; a fourth group consisting of a lens having a negative power; and a fifth group consisting of a biconcave lens, wherein an optical system of 0.01<BF/L<0.14 satisfies the following Conditions (1), (2) where a backfocus is BF, an entire length of the image-forming lens is L, a focal length of e-line of the first group is f1, a combined focal length of e-line of an entire system is f, and a space interval between the fourth group and the fifth group is d10.

$$-6.5 < f1/f < -2.2 \quad (1)$$

$$0.20 < d10/f < 0.50 \quad (2)$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENT

Hereinafter, an embodiment of an image-forming lens and embodiments of an image reader and an image-forming device using the image-forming lens will be described with reference to the drawings.

[Image-Forming Lens]

First Embodiment

An image-forming lens 5 (refer to FIG. 1) includes in order from the object side to the image side the following optical elements. In addition, the object side is the left side in FIG. 2 and the image side is the right side in FIG. 2.

Figure 2:
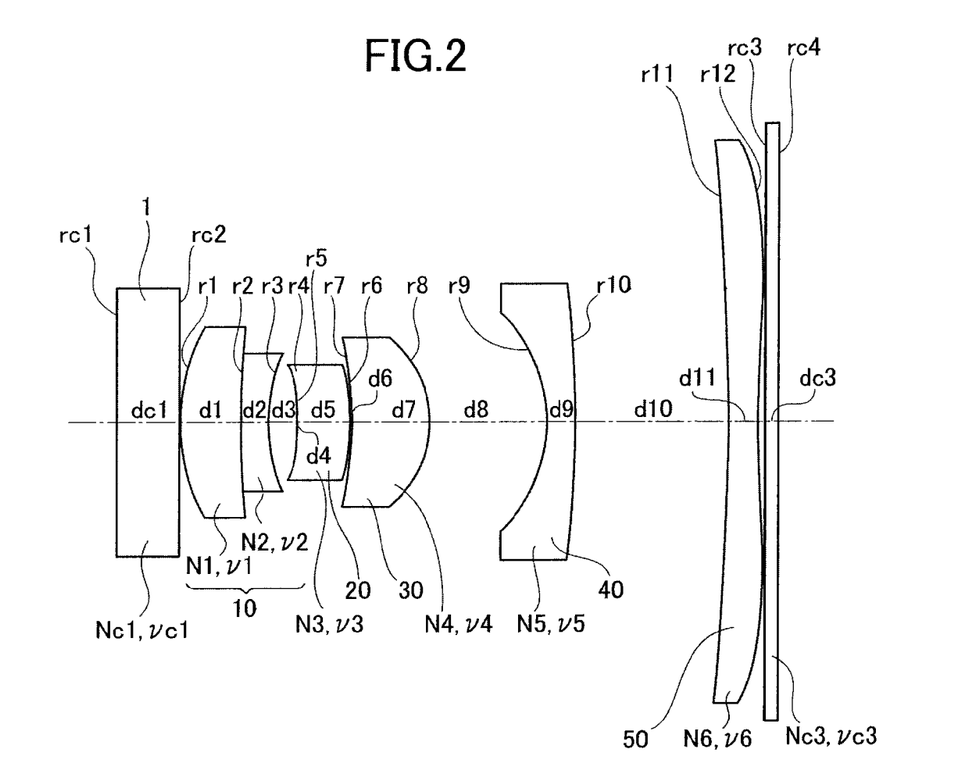
FIG. 2 is a view illustrating an embodiment of an image-forming lens according to the present invention.

The image-forming lens 5 includes in order from the object side to the image side a first group 10 having a negative refractive power as a whole, aperture stop, second group 20, third group 30, fourth group 40, and fifth group 50. The first group 10 includes a cemented lens made of a positive meniscus lens N1 (first lens) having a convex surface on the object side and a negative meniscus lens N2 (second lens) having a convex surface on the object side. The second group 20 includes a positive meniscus lens N3 (third lens) having a convex surface on the image side. The third group 30 includes a positive meniscus lens N4 (fourth lens) having a convex surface on the image side. The fourth group 40 includes a negative lens N5 (fifth lens), and the fifth group 50 includes a biconcave lens N6 (sixth lens).

[Condition (1)]

In the image-forming lens 5 in which a plurality of lens groups and the aperture stop are arranged as described above, it is necessary for the optical system of 0.01<BF/L<0.14 to satisfy the following Condition (1) where the backfocus of the image-forming lens 5 is BF and the entire length of the image-forming lens 5 is L.

$$-6.5 < f1/f < -2.2 \quad (1)$$

In this case, f1 is a focal length of e-line of the first group 10 as the cemented lens of the first and second lenses N1, N2, and f is a combined focal length of e-line of the entire system.

Condition (1) is to define the power of the first group 10. If the parameter exceeds the upper limit, the correction of the spherical aberration becomes excessive. If the parameter exceeds the lower limit, the correction of the spherical aberration becomes insufficient. In any case, the coma aberration is deteriorated, resulting in a decrease in an imaging performance. For this reason, it is necessary to satisfy Condition (1) for obtaining a preferable performance.

[Condition (2)]

It is necessary for the image-forming lens 5 to satisfy Condition (2).

$$0.20 < d10/f < 0.50 \quad (2)$$

In this case, d10 is a space interval between the fifth lens N5 and the sixth lens N6.

Condition (2) is to define the space interval between the fifth lens N5 and the sixth lens N6. If the parameter exceeds the upper limit, the correction of the spherical aberration becomes insufficient, resulting in a decrease in contrast. If the parameter exceeds the lower limit, it becomes difficult to correct the distortion, so that the flatness of imaging faces is deteriorated, resulting in a decrease in an off-axis performance. For this reason, it is necessary to satisfy Condition (2).

According to the above-described embodiment of the image-forming lens, when using the image-forming lens including a five-group and six-lens configuration having the first group, aperture stop, second group, third group, fourth group and fifth group, the on-axis chromatic aberration can be preferably corrected in a range from c-line (656.27 nm) to g-line (435.83 nm) with Conditions (1), (2) being satisfied.

The distortion is preferably corrected regardless of a wide half-angle of view of 37°, appropriate brightness of about 5.6 of F-number is obtained, the opening efficiency is close to 100% until the peripheral portion, the aberrations are preferably corrected, and a preferable performance having a high contrast in a high space frequency area can be obtained.

[Image-Forming Lens]

Second Embodiment

According to another embodiment of the image-forming lens, the length of the rectangular aperture stop in the main-scanning direction and the length of the rectangular aperture stop in the sub-scanning direction, which are required for obtaining the brightness similar to that of the circular aperture stop, are 2R' and πR'/2, respectively, where the aperture stop has a rectangular shape and a radius of a circular aperture stop required for obtaining a predetermined brightness is R' in the first embodiment.

[Definition of Main-Scanning Direction]
[Definition of Sub-Scanning Direction]

The main-scanning direction is a direction (front direction in FIG. 1) orthogonal to the arrow direction in FIG. 1 in which the reading optical unit 7 travels. The sub-scanning direction is a height direction (upper direction in FIG. 1) of the line sensor 6 orthogonal to the main-scanning direction.

Figure 3:
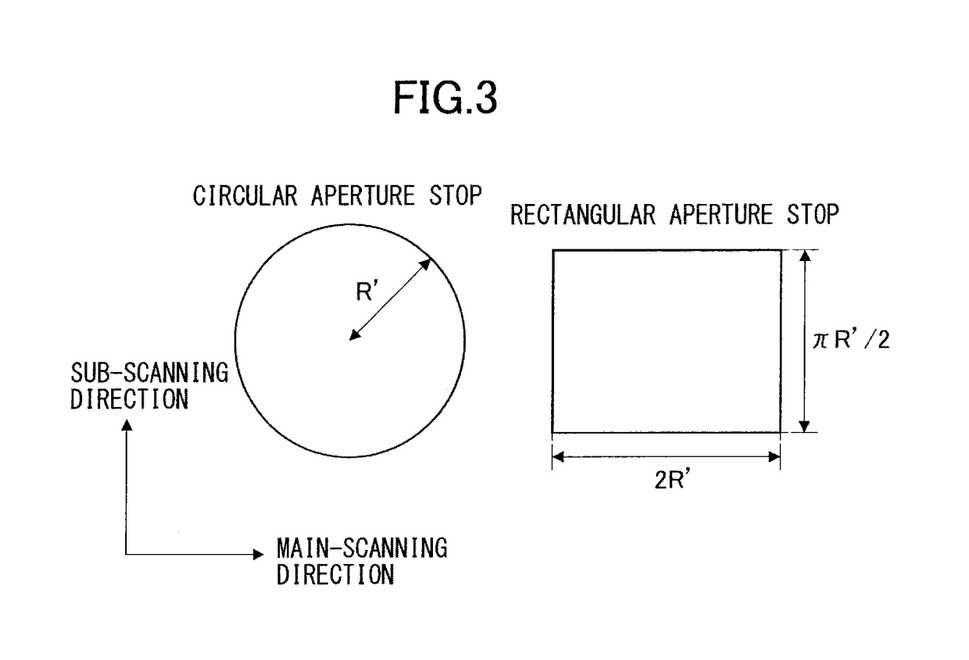
FIG. 3 is a view illustrating a rectangular opening of the image-forming lens.

FIG. 3 illustrates that the length of the rectangular aperture stop in the main-scanning direction and the length of the rectangular aperture stop in the sub-scanning direction, which are required for obtaining a brightness similar to that of the circular aperture stop, are 2R' and πR'/2, respectively, where the aperture stop has a rectangular shape and the radius of the circular aperture stop required for obtaining a predetermined brightness is R'.

As illustrated in FIG. 3, the opening area similar to that of the circular aperture stop can be obtained by defining the size of the rectangular aperture stop as described above. Accordingly, the light volume entering in the aperture stop can be maintained similar to that of the circular aperture stop.

MTF in the sub-scanning direction decays proportionally to the first power of cosine of an angle of view in accordance with an increase in an angle of view. MTF in the main-scanning direction decays proportionally to the third power of cosine of an angle of view. Therefore, MTF in the main-scanning direction can be increased, and the balance of MTF in the main and sub-scanning directions can be maintained by adopting the rectangular opening. In this case, MTF is Module Transfer Function (cutoff frequency).

According to the above-described embodiment of the image-forming lens, the opening area similar to that of the circular aperture stop can be obtained by defining the size of the rectangular aperture stop, so that the light volume entering in the aperture stop can be maintained similar to that of the circular aperture stop. Moreover, the balance of MTF in the main and sub-scanning directions can be maintained by adopting the rectangular opening.

[Image-Forming Lens]

Third Embodiment

According to another embodiment of an image-forming lens, the sixth lens N6 is made of a plastic, and has a strip shape extending in the main-scanning direction in First Embodiment or Second Embodiment.

A diameter substantially similar to that of the line sensor 6 in the longitudinal direction (upper direction in FIG. 1) is required for the sixth lens N6 because the sixth lens N6 is disposed near the imaging surface. For this reason, when the sixth lens has a circular shape, the outer diameter of the lens is significantly increased, and the size of the image reader is increased in the height direction (upper direction in FIG. 1), so that the costs of the sixth lens N6 are increased. The costs can be lowered by using a plastic sixth lens N6.

Figure 4:
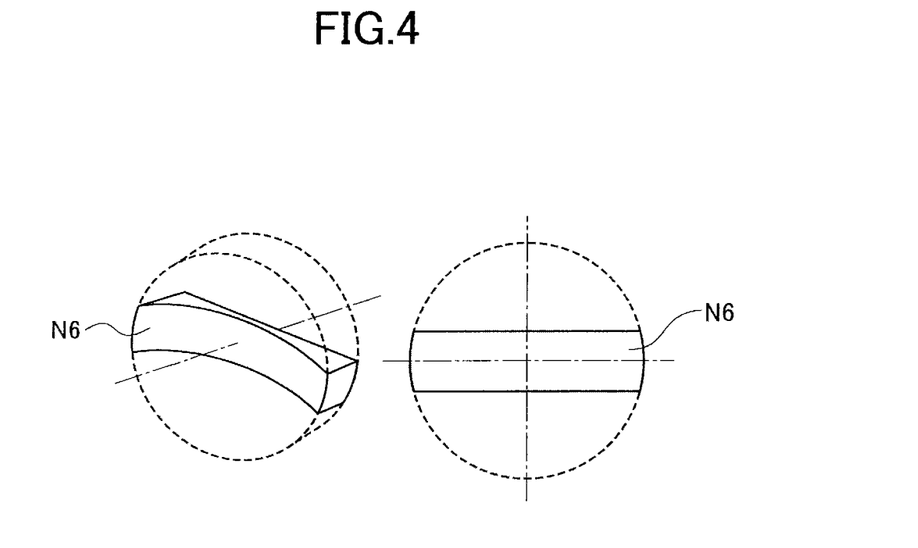
FIG. 4 is a view illustrating a strip-shaped sixth lens of the image-forming lens.

FIG. 4 illustrates an example of a strip-shaped sixth lens N6. As illustrated in FIG. 4, the thickness and costs of the image-forming lens and the image reader can be deceased by forming the external form of the sixth lens into the strip shape extending in the main-scanning direction.

In addition, in the image-forming device, it is not necessary for the external shape of the image reader to have rotational symmetry to the optical axis because document information is imaged on the line sensor 6 as a line.

According to the above-described embodiment of the image-forming lens, the sixth lens is made of a plastic, and has a strip shape extending in the main-scanning direction. With this configuration, the costs of the image-forming lens can be lowered, and the size of the image-forming lens can be reduced.

Embodiment of Image-Forming Lens

Next, embodiments of an image-forming lens according to the present invention will be described with specific values. The meanings of the reference signs in each embodiment are as follows.

f: combined focal length of e-line of entire system
F No: F-number
m: compression rate
Y: object height
ω: half angle of view
BF: backfocus of lens
L: entire length of lens
R': radius of circular aperture stop required for obtaining predetermined brightness (F No)
ri (i=1-12): curvature radius of i-th lens surface from object side
di (i=1-11): i-th surface interval from object side
nj (j=1-6): refractive index of j-th lens material from object side
vj (j=1-6): Abbe's number of j-th lens from object side
rc1: curvature radius of object side of contact glass
rc2: curvature radius of image side of contact glass
rc3: curvature radius of object side of CCD cover glass
rc4: curvature radius of image side of CCD cover glass
dc1: thickness of contact glass
dc3: thickness of CCD cover glass
nc1: refractive index of contact glass
nc3: refractive index of CCD cover glass
vc1: Abbe's number of contact glass
vc3: Abbe's number of CCD cover glass
nd: refractive index of d-line
vd: Abbe's number of d-line
ne: refractive index of e-line
f1: focal length of e-line of first group
d10: space interval between fifth lens and sixth lens The aspheric surface is expressed by the following equations.

$$X = X1 + X2$$

$$X1 = (1/R) \times Y^2 / (1 + SQRT(1 - (1+K) \times (Y/R)^2))$$

$$X2 = A4 \times Y^4 + A6 \times Y^6 + A8 \times Y^8 + A10 \times Y^{10}$$

In this case, the respective parameters are as follows.
X: distance from contact plane in aspheric surface apex in height Y from optical axis
Y: height from optical axis
R: paraxial curvature radius of aspheric surface
K: conical multiplier
A4, A6, A8, A10: aspheric surface coefficient
SQRT: meaning of square root FIG. 2 is an optical arrangement view illustrating an embodiment of an image-forming lens according to the present invention. The above reference signs are applied to the optical arrangement view. The aberration views and the configuration table of the lens of each of the following embodiments are based on the optical arrangement view.

In the numerical examples, E-XY means 10-XY. The wavy line shows a sine condition in the spherical aberration view, and the solid and dotted lines in the astigmatism view show a sagittal light beam and a meridional light beam, respectively.

Embodiment 1

Figure 5:
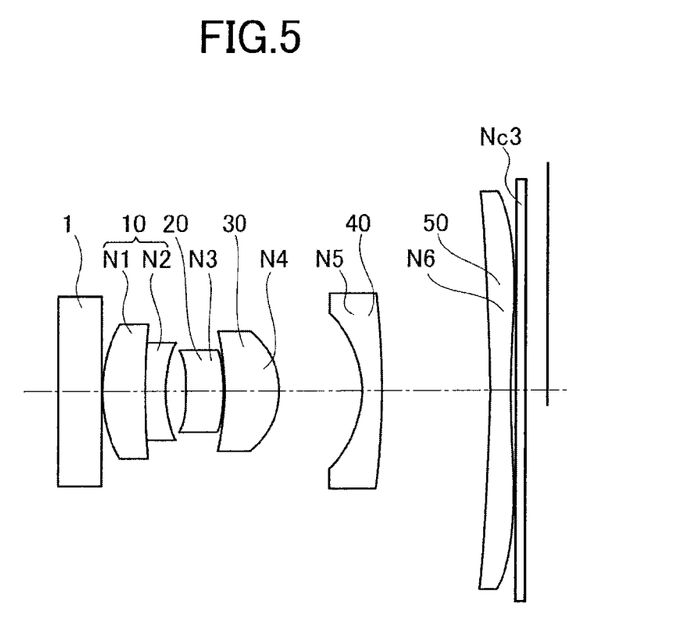
FIG. 5 is an optical arrangement view of Embodiment 1 of the image-forming lens.
Figure 6:
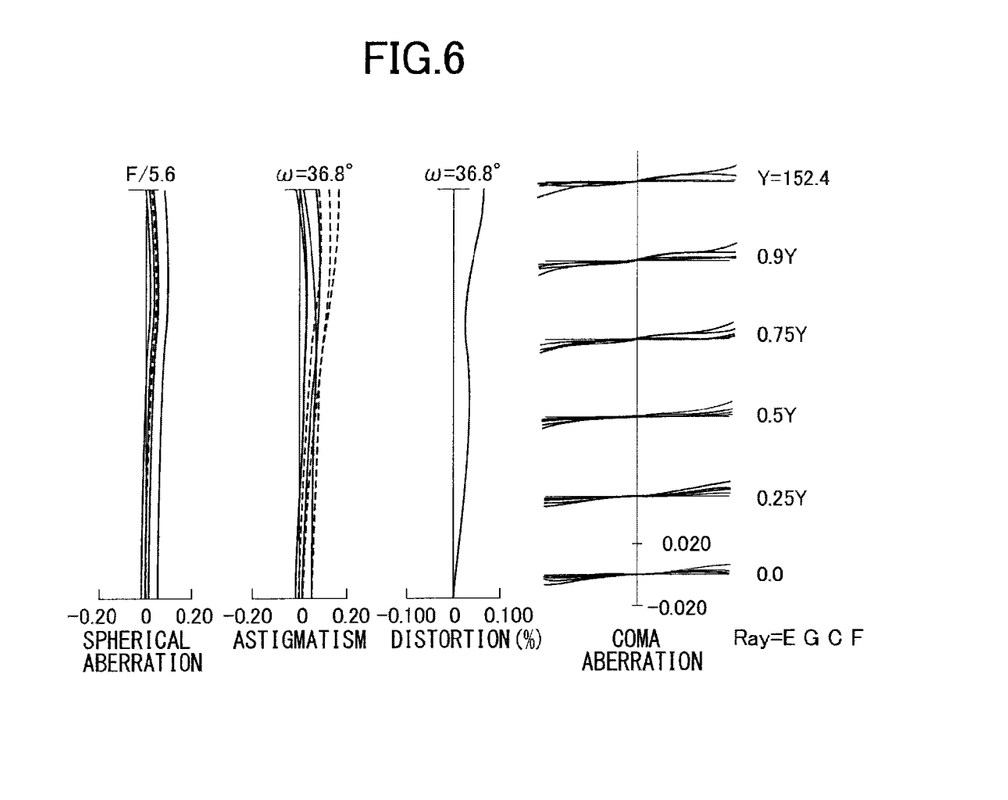
FIG. 6 is aberration views of Embodiment 1 of the image-forming lens.

FIG. 5 provides the configuration view of the present embodiment and FIG. 6 provides the aberration views of the present embodiment. The respective values in the present embodiment are as follows.

f=20.373, FNo=5.6, m=0.11102, Y=152.4, ω=36.8°, BF=1.483, L=30.360, R'=1.58 length of rectangular aperture stop in main-scanning direction: 2R'=3.16 length of rectangular aperture stop in sub-scanning direction: $\pi R'/2=2.48$

The respective parameters (j, r, d, nd, vd, ne, glass name) in Embodiment 1 are shown in Table 1.

TABLE 1

| j | r | d | nd | vd | ne | GLASS NAME |
|---|---|---|---|---|---|---|
| c1 | ∞ | 3.200 | 1.51633 | 64.14 | 1.51825 | SBSL7 (OHARA) |
| c2 | ∞ | — | — | — | — | — |
| 1 | 12.899 | 3.114 | 1.69350 | 53.18 | 1.69661 | LLAL13 (OHARA) |
| 2 | 42.428 | 1.500 | 1.84666 | 23.77 | 1.85504 | LTIH53 (OHARA) |
| 3 | 10.714 | 1.448 | — | — | — | — |
| 4 | ∞ (APERTURE STOP) | 0.131 | — | — | — | — |
| 5 | −18.208 | 2.790 | 1.68893 | 31.08 | 1.69417 | LTIM28 (OHARA) |
| 6 | −12.864 | 0.100 | — | — | — | — |
| 7 | −21.737 | 4.079 | 1.61800 | 63.33 | 1.62033 | SPHM52 (OHARA) |
| 8 | −6.052 | 6.151 | — | — | — | — |
| 9 | −8.700 | 1.500 | 1.68893 | 31.08 | 1.69417 | LTIM28 (OHARA) |
| 10 | −47.557 | 7.971 | — | — | — | — |
| 11 | −189.311 | 1.577 | 1.52861 | 55.53 | 1.53088 | ZE48R (ZEONEX) |
| 12 | 74.483 | — | — | — | — | — |
| c3 | ∞ | 0.700 | 1.51633 | 64.14 | 1.51825 | SBSL7 (OHARA) |
| c4 | ∞ | — | — | — | — | — |

The respective parameters (surface number, A4, A6, A8, A10) in Embodiment 1 are shown in Table 2.

TABLE 2

| SURFACE NUMBER | K | A4 | A6 | A8 | A10 |
|---|---|---|---|---|---|
| 1 | 0 | 1.94444E−04 | 1.90265E−06 | 3.57879E−08 | 1.19522E−10 |
| 3 | 0 | 9.25694E−04 | −6.94114E−06 | 4.51781E−06 | −3.80294E−07 |
| 5 | 0 | −7.99162E−04 | −9.18788E−05 | 1.31807E−05 | −2.01982E−06 |
| 10 | 0 | 9.42068E−05 | −6.93578E−07 | 3.73858E−09 | −9.48401E−12 |
| 12 | 0 | −4.42217E−05 | −1.55545e−08 | 6.03535E−11 | −1.49961E−13 |

Embodiment 2

Figure 7:
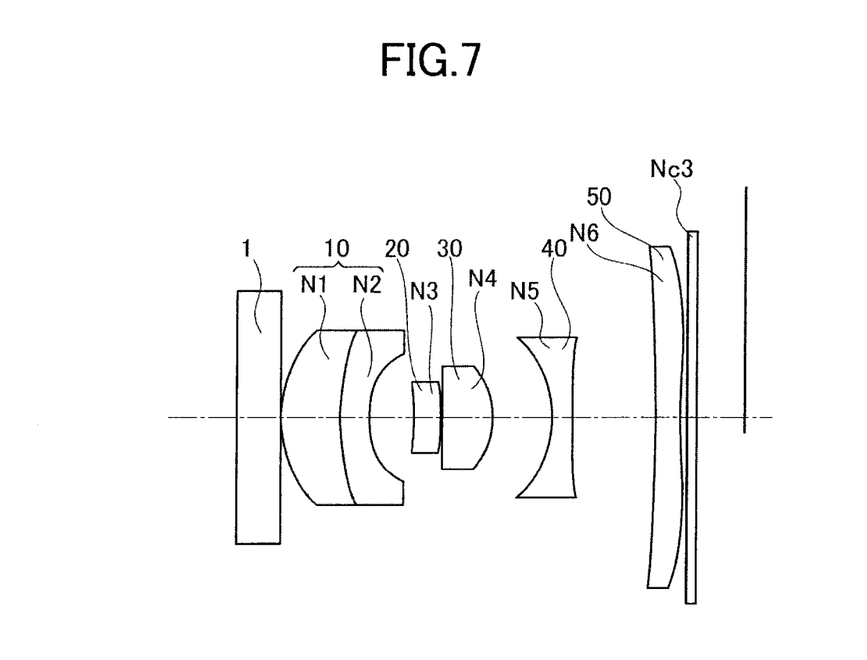
FIG. 7 is an optical arrangement view of Embodiment 2 of the image-forming lens.
Figure 8:
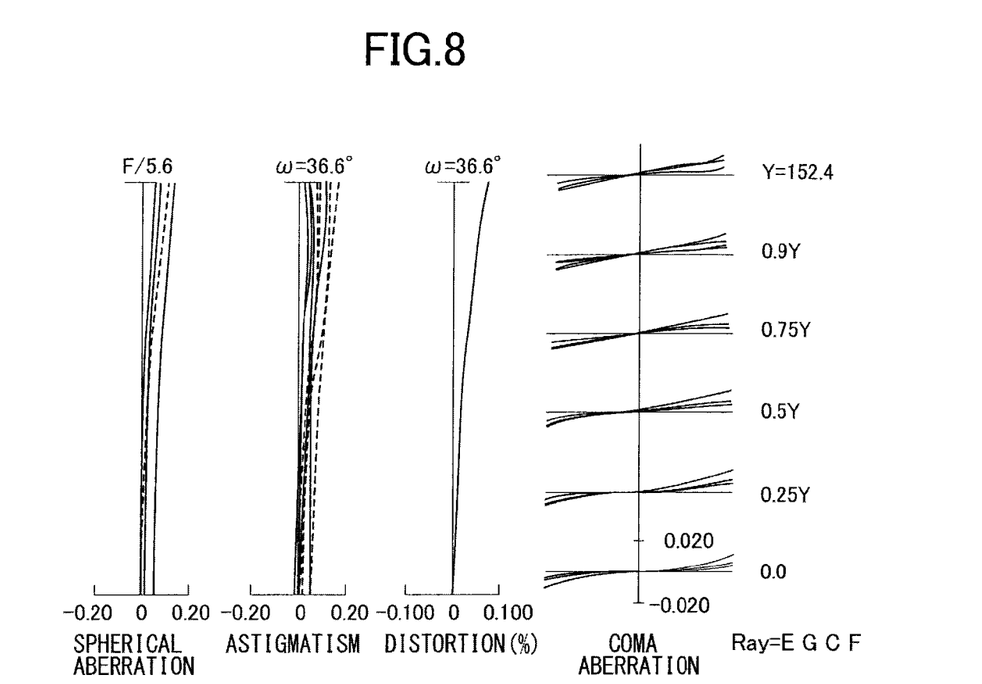
FIG. 8 is aberration views of Embodiment 2 of the image-forming lens.

FIG. 7 provides the configuration view of the present embodiment and FIG. 8 provides the aberrations views of the present embodiment. The respective values in the present embodiment are as follows.

f=20.505, FNo=5.6, m=0.11102, Y=152.4, ω=36.6°, BF=3.503, L=29.555, R'=1.63 length of rectangular aperture stop in main-scanning direction: $2R'=3.26$ length of rectangular aperture stop in sub-scanning direction: $\pi R'/2=2.56$ The respective parameters (j, r, d, nd, vd, ne, glass name) in Embodiment 2 are shown in Table 3.

TABLE 3

| j | r | d | nd | vd | ne | GLASS NAME |
|---|---|---|---|---|---|---|
| c1 | ∞ | 3.200 | 1.51633 | 64.14 | 1.51825 | SBSL7 (OHARA) |
| c2 | ∞ | — | — | — | — | — |
| 1 | 10.971 | 4.289 | 1.43875 | 94.93 | 1.43985 | SFPL53 (OHARA) |
| 2 | 20.419 | 2.092 | 1.84666 | 23.77 | 1.85504 | LTIH53 (OHARA) |
| 3 | 8.845 | 3.217 | — | — | — | — |
| 4 | ∞ (APERTURE STOP) | 0.112 | — | — | — | — |
| 5 | −45.603 | 2.172 | 1.90270 | 31.00 | 1.90958 | LLAH86 (OHARA) |
| 6 | −19.760 | 0.100 | — | — | — | — |
| 7 | −131.976 | 3.701 | 1.61800 | 63.33 | 1.62033 | SPHM52 (OHARA) |
| 8 | −6.205 | 4.418 | — | — | — | — |
| 9 | −8.771 | 1.500 | 1.68893 | 31.08 | 1.69417 | LTIM28 (OHARA) |
| 10 | 198.224 | 6.153 | — | — | — | — |
| 11 | −187.872 | 1.800 | 1.52861 | 55.53 | 1.53088 | ZE48R (ZEONEX) |
| 12 | 74.740 | — | — | — | — | — |
| c3 | ∞ | 0.700 | 1.51633 | 64.14 | 1.51825 | SBSL7 (OHARA) |
| c4 | ∞ | — | — | — | — | — |

The respective parameters (surface number, A4, A6, A8, A10) in Embodiment 2 are shown in Table 4.

TABLE 4

| SURFACE NUMBER | K | A4 | A6 | A8 | A10 |
|---|---|---|---|---|---|
| 1 | 0 | 7.42773E−05 | 9.84848E−07 | 2.38323E−09 | 2.32115E−10 |
| 3 | 0 | 6.78911E−04 | 1.93254E−05 | 4.89238E−07 | 1.96106E−08 |
| 5 | 0 | −5.01010E−04 | −1.88126E−05 | −2.00955E−06 | 1.87699E−07 |
| 10 | 0 | 2.27532E−04 | −2.75070E−06 | 2.27599E−08 | −1.08365E−10 |
| 12 | 0 | −9.03938E−05 | 3.08835E−07 | −1.08290E−09 | 1.15701E−12 |

Embodiment 3

Figure 9:
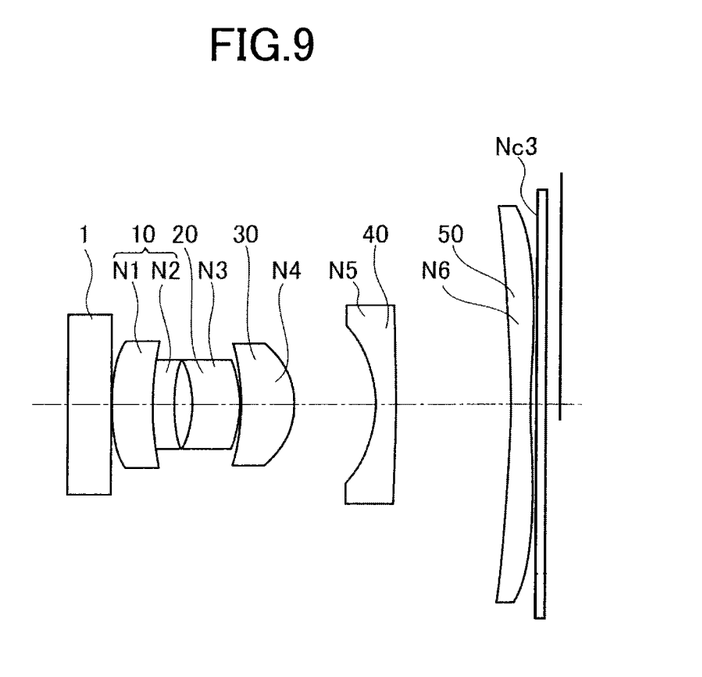
FIG. 9 is an optical arrangement view of Embodiment 3 of the image-forming lens.
Figure 10:
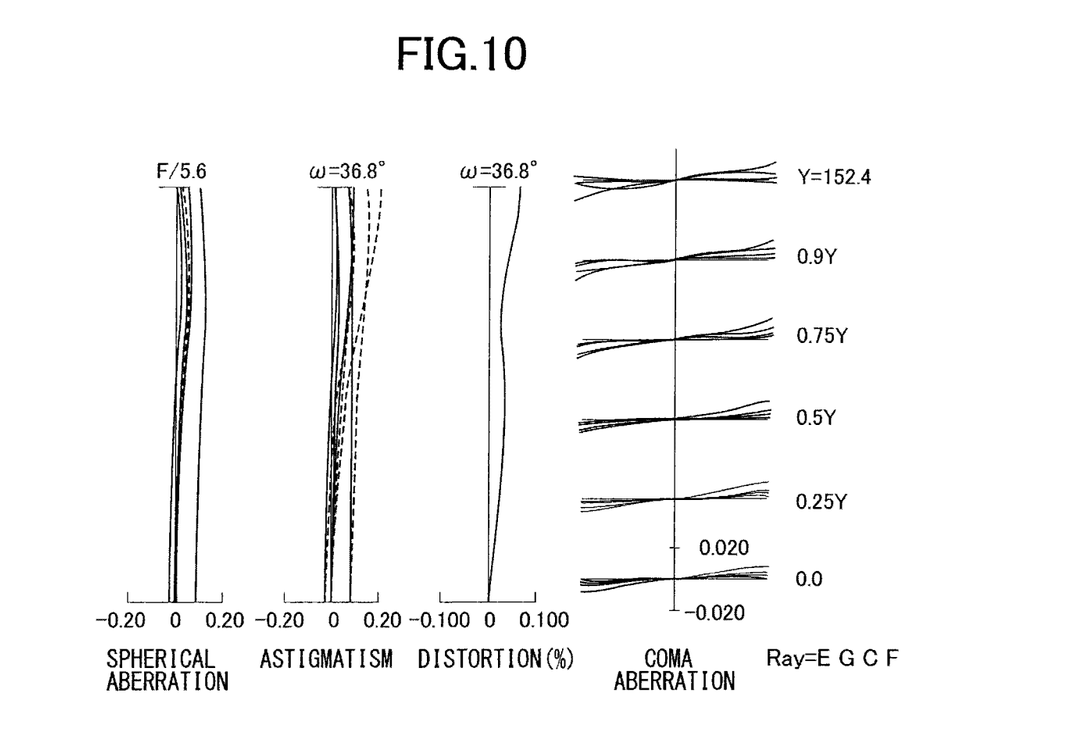
FIG. 10 is aberration views of Embodiment 3 of the image-forming lens.

FIG. 9 provides the configuration view of the present embodiment and FIG. 10 provides the aberration views of the present embodiment. The respective values in the present embodiment are as follows.

f=20.336, FNo=5.6, m=0.11102, Y=152.4, ω=36.8°, BF=0.998, L=31.226, R'=1.55 length of rectangular aperture stop in main-scanning direction: 2R'=3.10 length of rectangular aperture stop in sub-scanning direction: πR'/2=2.44

The respective parameters (j, r, d, nd, vd, ne, glass name) in Embodiment 3 are shown in Table 5.

TABLE 5

| j | r | d | nd | vd | ne | GLASS NAME |
|---|---|---|----|----|----|------------|
| c1 | ∞ | 3.200 | 1.51633 | 64.14 | 1.51825 | SBSL7 (OHARA) |
| c2 | ∞ | — | — | — | — | |
| 1 | 12.899 | 3.114 | 1.69350 | 53.18 | 1.69661 | LLAL13 (OHARA) |
| 2 | 42.428 | 1.500 | 1.84666 | 23.77 | 1.85504 | LTIH53 (OHARA) |
| 3 | 10.714 | 1.448 | — | — | — | |
| 4 | ∞ (APERTURE STOP) | 0.131 | — | — | — | |
| 5 | −18.208 | 2.790 | 1.68893 | 31.08 | 1.69417 | LTIM28 (OHARA) |
| 6 | −12.864 | 0.100 | — | — | — | |
| 7 | −21.737 | 4.079 | 1.61800 | 63.33 | 1.62033 | SPHM52 (OHARA) |
| 8 | −6.052 | 6.151 | — | — | — | |
| 9 | −8.700 | 1.500 | 1.68893 | 31.08 | 1.69417 | LTIM28 (OHARA) |
| 10 | −47.557 | 7.971 | — | — | — | |
| 11 | −189.311 | 1.577 | 1.52861 | 55.53 | 1.53088 | ZE48R (ZEONEX) |
| 12 | 74.483 | — | — | — | — | |
| c3 | ∞ | 0.700 | 1.51633 | 64.14 | 1.51825 | SBSL7 (OHARA) |
| c4 | ∞ | — | — | — | — | |

The respective parameters (surface number, A4, A6, A8, A10) in Embodiment 3 are shown in Table 6.

TABLE 6

| SURFACE NUMBER | K | A4 | A6 | A8 | A10 |
|---|---|---|---|---|---|
| 1 | 0 | 1.94444E−04 | 1.90265E−06 | 3.57879E−08 | 1.19522E−10 |
| 3 | 0 | 9.25694E−04 | −6.94114E−06 | 4.51781E−06 | −3.80294E−07 |
| 5 | 0 | −7.99162E−04 | −9.18788E−05 | 1.31807E−05 | −2.01982E−06 |
| 10 | 0 | 9.42068E−05 | −6.93578E−07 | 3.73858E−09 | −9.48401E−12 |
| 12 | 0 | −4.42217E−05 | −1.55545e−08 | 6.03535E−11 | −1.49961E−13 |

Table 7 shows the values of the conditions.

TABLE 7

| ITEM | f1 | f1/f | d10 | d10/f |
|---|---|---|---|---|
| EMBODIMENT 1 | −92.372 | −4.534 | 7.971 | 0.391 |
| EMBODIMENT 2 | −48.076 | −2.345 | 6.153 | 0.300 |
| EMBODIMENT 3 | −129.682 | −6.377 | 8.568 | 0.421 |

Embodiment of Image Reader

An image reader of the present embodiment includes an illumination system which illuminates a document, an imaging lens which reduces and images a reflection light of the document illuminated by the illumination system, and a line sensor which photoelectrically converts a document image imaged by the imaging lens. Such an image reader uses as the imaging lens the image-forming lens described in the first, second or third embodiment.

The embodiment of the image reader according to the present invention will be described with reference to FIG. 1.

In FIG. 1, the document 2 having an image to be read is flatly placed on a contact glass 1 as a platen. An illumination section 3 is provided below the contact glass 1. A long slit portion extending in the direction orthogonal to the page is illuminated by using the illumination unit including a reflector and a xenon lamp or halogen lamp as an illuminating unit extending in the direction orthogonal to the paper.

The reflection light from the image of the illuminated portion in the document 2 is sequentially reflected by five folding minors, M1, M2, M3, M4, M5, and a reduced image of the document image is imaged on the imaging surface of the line sensor 6 as a photoelectric conversion element by the image-forming lens 5.

The illumination unit 3, folding mirrors M1, M2, M3, M4, M5, image-forming lens 5 and line sensor 6 are integrally held as the reading optical unit 7. The reading optical unit 7 travels in the right direction of the arrow direction in the figure by a not-shown driver, and reads the information of the entire document by displacing to the position illustrated by the dashed line.

The line sensor 6 of an imaging portion is a so-called three-line CCD (three line sensor) in which photoelectrical conversion elements 6A, 6B, 6C having filters of red (R), green (G) and blue (B) as a color-resolving unit are arranged in three lines in one chip. The line sensor 6 converts the document image into image signals with the illumination and scanning of the document 2. The document 2 is thereby read, and the color image of the document 2 is resolved into three primary colors of red (R), green (G), and blue (B) to be read.

The image reader is a device which reads an image in full color, and includes a three-line CCD 6 as a color-resolving unit provided in an imaging optical path of the image-forming lens 5.

A method different from the above color-resolving method includes a method of resolving into red (R), green (G), and blue (B) by selectively inserting a color-resolving prism or a filter between the image-forming lens 5 and the CCD as the line sensor 6. A method of illuminating a document by sequentially lighting the light sources of red (R), green (G) and blue (B) can be used.

The document information can be read as monochrome information without having the color-resolving element in the imaging optical path. In this embodiment, the five folding mirrors are described, but the number of the folding mirrors can be determined according to the shape of the image reader, for example.

According to the above-described embodiment of the image reader, the document information can be preferably read by using the image-forming lens of the first, second or third embodiment as the imaging lens, so that a compact image-forming device can be obtained with low costs. Moreover, material saving and global environment protection can be achieved.

Another Embodiment of Image Reader

Another embodiment of an image reader according to the present invention includes a color-resolving function in an arbitrary optical path of an optical system, and reads document information in full color.

According to the above-described embodiment of the image reader, a full-color image can be read with good performance by using a lens in which on-axis chromatic aberration is well corrected in the image reader having a color-resolving function in an optical system. Moreover, multiple functions and high performance can be achieved.

Another Embodiment of Image Reader

Another embodiment of the image reader according to the present invention includes an LED light source of an illumination system.

According to the above-described embodiment of the image reader, by using the LED light source as a light source of an illumination system, the power consumption of the reading optical system can be reduced. Moreover, energy saving can be achieved.

Embodiment of Image-Forming Device

The image-forming device according to the embodiment of the present invention includes the image reader according to the embodiment of the present invention.

Figure 11:
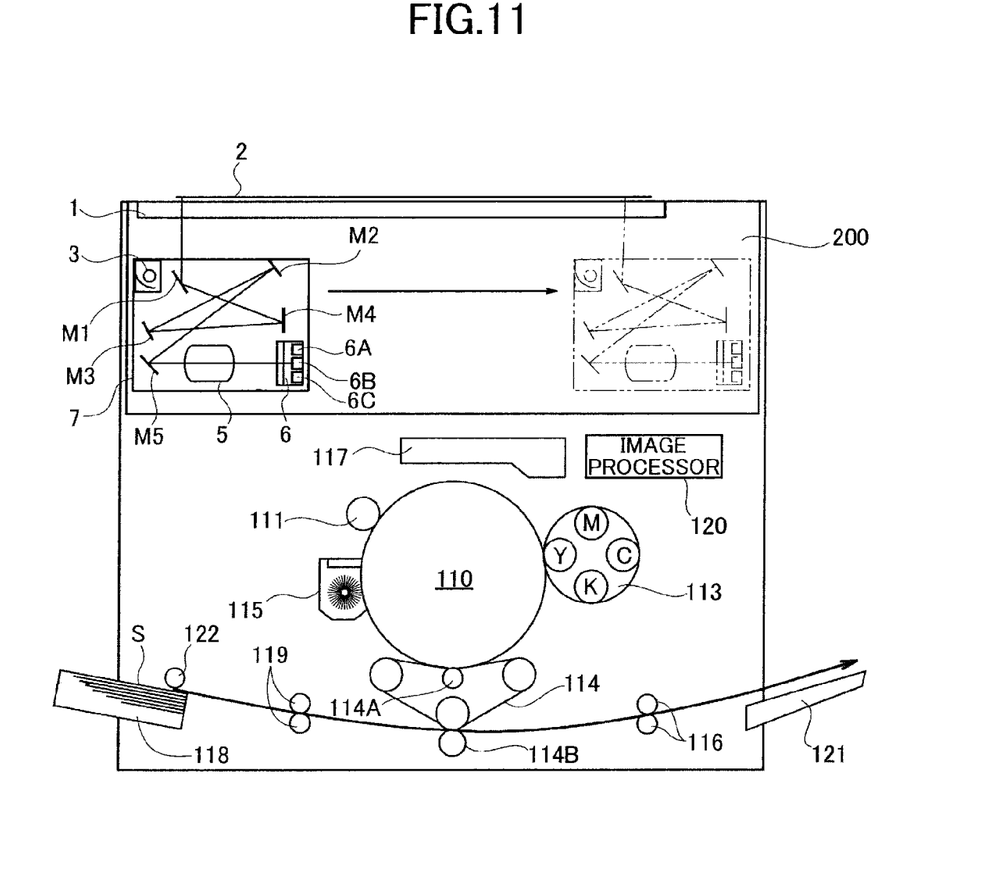
FIG. 11 is a view illustrating an embodiment of an image-forming device according to the present invention.

The embodiment of the image-forming device according to the present invention will be described. FIG. 11 is a view describing the image-forming device.

In FIG. 11, the image-forming device includes an image reader 200 located in the upper portion of the device and an image-forming unit located below the image reader. The image reader 200 is the same as that described for FIG. 1, and the reference numbers which are the same as those in FIG. 1 are applied to respective portions.

The image signal output from the line sensor 6 as an imaging unit in the image reader 200 is sent to an image processor 120, and then is converted into a signal for writing each color of yellow (Y), magenta (M), cyan (C) and black (K), which is a writing signal processed in the image processor 120.

The image-forming unit includes a cylindrical photoconductive photoreceptor 110 as a latent image carrier, and includes around the photoreceptor 110 a charging roller 111 as a charger, revolver development unit 113, transfer belt 114, and cleaner 115. A corona charger can be used as the charger instead of the charging roller 111.

An optical scanner 117 scans the photoreceptor 110 between the charging roller 111 and the development unit 113 after receiving the writing signal from the signal processor 120.

Reference number 116 denotes a fuser, 118 denotes a cassette, 119 denotes a pair of registration rollers, 122 denotes a paper-feeding roller, 121 denotes a tray, S denotes a transfer sheet as a recording medium.

When forming an image, the photoreceptor 110 rotates at a constant velocity in the clockwise direction, and the surface of the photoreceptor 110 is uniformly charged by the charging roller 111, so that an electrostatic latent image is formed by receiving the exposure with the optical writing of the laser beam of the optical scanner 117. The formed electrostatic latent image is a so-called negative latent image in which an image portion is exposed. In this case, so-called reversal development is performed.

The writing of the toner image is performed in order from a yellow image, magenta image, cyan image and black image in accordance with the rotation of the photoreceptor 110. More specifically, the formed electrostatic latent image is reversely developed by the respective development units Y (development by yellow toner), M (development by magenta toner), C (development by cyan toner) and K (development by black toner) of the revolver development unit 113 to be visualized as a positive image.

The obtained toner images of respective colors are sequentially transferred on the transfer belt 114 by a transfer voltage application roller 114A, and the toner images of respective colors are overlapped on the transfer belt 114 to be a color image.

The cassette 118 housing transfer sheets S is detachably attached to the main body of the image-forming device. As illustrated in FIG. 11, the top sheet of the transfer sheets S housed in the cassette 118 is fed by the paper feeding roller 121 in a state in which the cassette 118 is attached to the main body of the image-forming device. The leading end portion of the fed transfer sheet S is captured by a pair of registration rollers 119.

The pair of registration rollers 119 sends the transfer sheet S to the transfer portion in timing of the movement of the color image by the toner on the transfer belt 114 to the transfer position. The sent transfer sheet S is overlapped with the color image in the transfer portion, and the color image is electrostatically transferred by the operation of the transfer roller 114B. The transfer roller 114B presses the transfer sheet S to the color image in transferring.

The transfer sheet S on which the color image is transferred is sent to the fuser 116, and the color image is fused in the fuser 116, and is discharged on the tray 121 by not-shown discharge rollers through a carrying path by a not-shown guide. The surface of the photoreceptor 110 is cleaned by the cleaner 115 every time a toner image of each color is transferred, and the residual toner, paper powder and the like are eliminated.

As described above, according to the above-described embodiment, an image is formed based on a preferable reading image quality by the image reader, so that an image-forming device which outputs a high quality image can be achieved with low costs.

According to the embodiments of the present invention, downsizing and low costs can be achieved.

Although the embodiments of the present invention have been described above, the present invention is not limited thereto. It should be appreciated that variations may be made in the embodiments described by persons skilled in the art without departing from the scope of the present invention.

What is claimed is:

1. An image-forming lens, comprising: in order from an object side to an image side a first group having a negative power as a whole, the first group consisting of a positive meniscus lens having a convex surface on the object side and a negative meniscus lens having a convex surface on the object side, the positive meniscus lens and the negative meniscus lens being cemented;

an aperture stop;

a second group consisting of a positive meniscus lens having a convex surface on the image side;

a third group consisting of a positive meniscus lens having a convex surface on the image side;

a fourth group consisting of a lens having a negative power; and a fifth group consisting of a biconcave lens, wherein a backfocus BF, an entire length of the image-forming lens L, a focal length of e-line of the first group f1, a combined focal length of e-line of an entire system f, and a space interval between the fourth group and the fifth group d10 satisfy the following conditions:

$$-6.5 < f1/f \leq 2.2, \quad (1)$$

$$0.20 < d10/f < 0.50, \text{ and} \quad (2)$$

$$0.01 < BF/L < 0.14. \quad (3)$$

2. The image-forming lens according to claim 1, wherein the aperture stop includes a rectangular shape, a length of the aperture stop in a main-scanning direction is 2R' and a length of the aperture stop in a sub-scanning direction is $\pi R'/2$ where the aperture stop has a rectangular shape and a radius of a circular aperture stop required for obtaining a predetermined brightness is R'.

3. The image-forming lens according to claim 1, wherein the biconcave lens of the fifth group is made of a plastic, and includes a strip shape extending in the main-scanning direction of the aperture stop.

4. An image reader, comprising:

an illumination system configured to illuminate a document;

an imaging lens configured to reduce and image a reflection light of the document illuminated by the illumination system; and a line sensor configured to photoelectrically convert an image of the document imaged by the imaging lens, wherein the imaging lens is the image-forming lens according to claim 1.

5. The image reader according to claim 4, comprising:

a color resolving function in an optical path between a platen on which the document is placed and the line sensor, wherein information of the document is read in full color.

6. The image reader according to claim 4, wherein a light source of the illumination system is an LED.

7. An image-forming device configured to form an image by exposing a surface of an image carrier according to document information read by the image reader according to claim 4.

* * * * *